United States Patent [19]
Park et al.

[11] Patent Number: 6,055,129
[45] Date of Patent: *Apr. 25, 2000

[54] FLYING NEGATIVE PRESSURE AIR BEARING SLIDER WITH DIVIDED NEGATIVE PRESSURE POCKETS

[75] Inventors: Ki-Ook Park, Seoul; Dong-Seob Jang, Kyungki-do; In-Seop Jeong, Seoul; Tae-Seok Park, Suwon, all of Rep. of Korea

[73] Assignee: Samsung Electronics Co., Ltd., Suwon, Rep. of Korea

[ * ] Notice: This patent is subject to a terminal disclaimer.

[21] Appl. No.: 09/025,502

[22] Filed: Feb. 18, 1998

[51] Int. Cl.$^7$ .................................................. G11B 5/60
[52] U.S. Cl. ................................................. 360/103
[58] Field of Search ............................................ 360/103

[56] References Cited

U.S. PATENT DOCUMENTS

| | | | |
|---|---|---|---|
| 5,650,892 | 7/1997 | Dorius et al. | 360/103 |
| 5,650,893 | 7/1997 | Bolasna et al. | 360/103 |
| 5,872,685 | 2/1999 | Park et al. | 360/103 |

*Primary Examiner*—George J. Letscher
*Attorney, Agent, or Firm*—Jones Volentine, L.L.P.; Jeffrey P. Aiello

[57] ABSTRACT

A flying NPAB head slider configured for supporting a transducer proximate to a rotating disc. The slider includes two side rails extending from the leading edge to the trailing edge of the slider body, which form air bearing surfaces that develop positive lifting forces as the disc rotates beneath the slider. Two negative pressure air cavities are created, one proximate to each of the side rails in a central portion of the slider body, separated from each other by curved cross rails. In addition, two more negative pressure air cavities are created forward of the central negative pressure air cavities. The central and forward negative pressure air cavities on each side of the slider are divided by narrow central air bearing rails segments, which safely maintain the stable trapped drawing or suction forces in the cavities regardless of large skew angle variations while the disc drive is operating.

18 Claims, 9 Drawing Sheets

FLYING NEGATIVE PRESSURE AIR BEARING SLIDER WITH DIVIDED NEGATIVE PRESSURE POCKETS

BACKGROUND OF THE INVENTION

1. Field of the Invention

The present invention relates to magnetic recording devices. More specifically, the invention relates to a flying slider head with a magnetic transducer used for writing data to and reading data from a recording medium such as a magnetic disc.

2. Description of the Related Art

Magnetic recording systems transfer data through transducers that are supported by an air bearing film or layer as they move relative to the surface of a magnetic recording disc. Such transducers need to either "fly" (flying-type heads) at just a few micro-inches above a rotating disc surface or contact the rotating disc slightly (pseudo contact-type heads) within a safe range.

The air bearing film is produced by pressurization of the air as it flows between the rotating disc surface and the slider body. For flying heads, the air bearing functions to provide, without physical contact, a very thin clearance between the slider body and rotating disc. This minimizes surface wear and damage to the flying head and magnetic disc during operation while maintaining a close separation to ensure a high density magnetic recording structure.

As the nominal flying height (distance between the slider body and the rotating disc surface) of the flying slider decreases, the magnetic transducer achieves higher resolution between individual data bit locations on the disc. Therefore, to achieve a higher recording density the flying height must be reduced as much as possible without causing reliability problems. Problems can occur when excessive and unwanted variations in the flying height result in contact between the flying slider and the rapidly rotating recording medium. Any such contact leads to wear of the slider and the recording surface, and in certain conditions, can be catastrophic to the operation of the disc drive.

Accordingly, developments efforts continue to strive for lower and lower flying heights while trying to provide uniform or optimum flying height conditions across a range of flying conditions, such as tangential velocity variations from the inside to the outside tracks, high speed track seeking movement, and varying skew angles.

Disc circumferential speed increases linearly from the inner diameter (ID) to the outer diameter (OD) of the rotating disc. Because a slider typically flies higher as the velocity of the disc recording medium increases, there is a tendency for the slider's outer rail to fly higher than the inner rail. Therefore, the flying slider has a structure that ensures that a roll angle can be generated in an attempt to counteract the tendency of the outer rail to fly higher than the inner rail. The roll angle is defined as the tilt angle between the principal plane of the slider in the radial direction of the disc and the principal plane of the disc surface.

The ability to control or generate changes in the roll angle are important to counteract other forces generated during disc drive manufacture or operations. Some of these forces or factors that must be compensated for include: manufacturing errors in the gimbals which attach the slider to the suspension arm; dynamic forces applied to the air bearing slider by the track accessing arm during tracking accessing; and varying skew angles tangential to the disc rotation as measured from the slider center line.

For example, regardless of the particular skew angle with respect to the direction of air flow, unequal pressure distribution develops between the outer and inner side rails. This causes the slider to fly with the inner rail much closer to the disc surface than the outer rail. As a result, the probability of physical contact with the disc surface at this slider's minimum flying height increases. Therefore, there is a continuing effort to develop air bearing sliders that carry a transducer as close to the disc surface as possible with a constant flying height and roll angle regardless of the varying flying conditions such as disc velocity and skew angle variation.

To achieve stable flying characteristics, the slider should also fly at a pitch angle that falls within a safe predetermined range. The pitch angle is defined as the tilt angle between the principal plane of the slider body in the tangential direction of the rotating disc and the principal plane of the disc surface. The pitch angle is positive in the normal case in which the flying height of the rear portion of the slider is lower than that of the front portion of the slider. If the designed positive pitch angle is too small, the possibility exists that the slider will dip down or inadvertently transition to a negative pitch angle orientation, caused by internal or external interference for example, whereby the leading edge of the slider may hit the rotating disc. On the other hand, if the designed pitch angle is too large, the air stiffness needed for stable flying can be disadvantageously reduced, which may again result in a collision with the disc. Therefore, to maintain stability while avoiding the negative pitch angle situation, the slider should be configured such that the pitch angle can be controlled to fall within an optimum range.

Another factor to consider regarding pitch angle is the general tendency for the pitch angle to increase when the skew angle increases as the slider is positioned nearer to the outer diameter of the disc. Thus the pitch angle should fall within a safe range regardless of the skew angle variations to ensure the desired dynamic performance reliability of the head/disc interface.

FIG. 1 is a schematic perspective view of a conventional tapered flat slider. In FIG. 1, two rails 11a are formed in parallel at a predetermined height on a surface of a slim hexahedron body 10a to thus form lengthwise extending ABS's. A tapered or sloped portion 12a is formed at each leading edge (toward the direction of disc rotation) portion of the ABS rails 11a. In such a structure, air within a very thin boundary layer rotates together with the rotation of the disc due to surface friction. The disc drags air under the slider and along the air bearing surfaces in a direction approximately parallel to the tangential velocity of the disc. When passing between the rotating disc and the slider, the air is compressed by the ramp 12a on the leading edge of the rails 11a. This pressure creates a hydrodynamic lifting force at the ramp section which is sustained along each of the rails 11a resulting in a lifting force, thus allowing the slider to fly over the disc surface. Actually, the side rails 11a function as a pneumatic bearing, and thus have a positive pressure region at a portion along an axis of an air flow generated by a rotation of the magnetic disc.

Although this conventional slider is easily and economically fabricated, it suffers drawbacks in that the flying height, pitch angle and roll angle vary considerably according to the skew angle of the rotary type actuator, i.e., according to the radial position of the slider over the disc surface. In effect, the lifting force is reduced because of the skew angle, which reduces the flying height. Also, the skew angle causes a rolling motion such that the flying height is not uniform under both of the side rails 11a. For flying heights of 3.0 millionths of an inch and greater, minor height and tilt fluctuations in the slider do not generally affect the read/write operations of the disc. However, current-day standards require flying heights below 2.0 millionths of an inch. At such small flying heights, even minor variations in flying height, pitch angle and roll angle can severely affect the reliability of the head read/write function of a hard disc drive.

In light of the above, and to better realize a constant flying height and constant pitch and roll angles and to obtain an improved contact start stop (CSS) performance, most current air bearing sliders have adopted a negative pressure air bearing (NPAB) type of configuration as shown in FIG. 2. Such a slider has the same basic structure of the slider shown in FIG. 1, together with a cross rail connecting the ABS rails. That is, as shown in FIG. 2, two ABS rails 11b, each having a slope 12b at a leading edge thereof, are formed in parallel on a surface of a body 10b. A cross rail 13b having the same height as the ABS rail 11b is formed near the leading edge between the rails 11b proximate the slopes 12b. The cross rail 13b creates a negative, or sub-ambient pressure cavity 15b in proximity to the central surface portion of the body 10b downstream of the cross rail 13b. Thus, since the pressure of the air passing over the cross rail 13b is diffused as it passes the negative pressure cavity 15b, a pulling or suction force is downwardly applied on the slider which reduces suspension gram load and provides the advantage of a fast take off from the disc surface. The counter action between the positive and negative forces reduces the sensitivity of the slider flying height relative to disc velocity and increases the slider stiffness characteristics.

Nevertheless, the NPAB slider of FIG. 2 does suffer some drawbacks. For example, the amount of negative pressure in the cavity 15b is dependent on the air flow direction, meaning that differing pressures will exist at differing skew angles. This results in a non-uniform operation along the full diameter of the disc. In particular, higher skew angles may cause more severe negative roll fluctuations compared to conventional tapered flat slider. Also, there is a tendency for debris to gather at the cross-rail 13b in the forward cavity 16b. Such debris can ultimately have an adverse effect on performance since the accumulated particles may cause head crashes and undue wear of the head and disc.

SUMMARY OF THE INVENTION

In consideration of the above, an object of the present invention is to provide an improved flying NPAB head slider which exhibits less flying variations by reducing skew angle effects, to thereby achieve stable flying operating characteristics.

It is another object of the present invention to provide an advanced flying NPAB head slider for magnetic recording systems that displays a relatively constant degree of roll angle, regardless of the slider skew angle and peripheral speed variations along the slider's path from the inner diameter to the outer diameter of the disc.

It is another object of the present invention to provide an improved flying NPAB head slider for magnetic recording systems that exhibits a stable pitch angle range across the entire data area.

It is another object of the present invention to provide an improved flying NPAB slider that retains the fast take-off features of conventional NPAB sliders, while at the same time reducing the amount of debris accumulation around the cross rails that generate the negative pressure regions.

To achieve the above objects, the present invention provides a flying NPAB head slider configured for supporting a transducer proximate to a rotating disc. The slider includes two side rails extending to the trailing edge, which form the main air bearing surfaces that develop positive lifting forces as the disc rotates beneath the slider. Two negative pressure air cavities are created, one proximate to each of the side rails in a central portion of the slider body, separated from each other by curved cross rails. In addition, two more negative pressure air cavities are created forward of the central negative pressure air cavities. The central and forward negative pressure air cavities on each side of the slider are divided by narrow central air bearing rails segments, which safely maintain the stable trapped drawing or suction forces in the cavities regardless of large skew angle variations while the disc drive is operating.

Each of the two side rails contains wide portions at the leading edge and wide portions at the trailing edge, with narrow portions in the middle connecting the leading and trailing edges. Therefore, the majority of the lifting force from the side rails is generated and concentrated in the four corners of the slider body. The combination of the lifting force at the corners, the drawing force at the four negative pressure air cavities, and the reduced suspension gram load, provides for a uniform flying attitude regardless of changes in the skew angle, resulting in a dynamically stable flying slider with a constant flying height, a constant roll angle, and a stable pitch angle.

The cross rails dividing the negative pressure air cavities have a curved shape that helps preserve the sub-ambient pressure force trapped in the negative pressure cavity as well as minimizes debris collection around the cross rail. The slider of the present invention eliminates any blunt lateral edges blocking the main air flow stream, which provides dynamically reliable flying characteristics and a stable flying attitude. The flying NPAB slider of the present invention retains excellent CSS (contact start stop) advantages and constant suspension gram loads, while minimizing the actual contact area of the slider.

The first and second projections on the slider body therefore define respective wide leading edge air bearing surfaces, wide trailing edge air bearing surfaces, narrow exterior air bearing surfaces, narrow interior air bearing surfaces, central negative pressure air cavities and forward negative pressure air cavities. These elements of the first and second projections may be symmetrically and/or asymmetrically configured on opposite sides of the central longitudinal axis of the slider body in many different combinations, depending on the operating environment of the slider head. Also the opening, which is defined by the narrow interior air bearing surfaces, may be either centered across, or offset from, the central longitudinal axis of the slider body, depending on the operating environment of the slider head.

BRIEF DESCRIPTION OF THE DRAWINGS

The above objects and advantages of the present invention will be described in detail with reference to the attached drawings, in which.

DETAILED DESCRIPTION OF THE PREFERRED EMBODIMENTS

Figure 1:
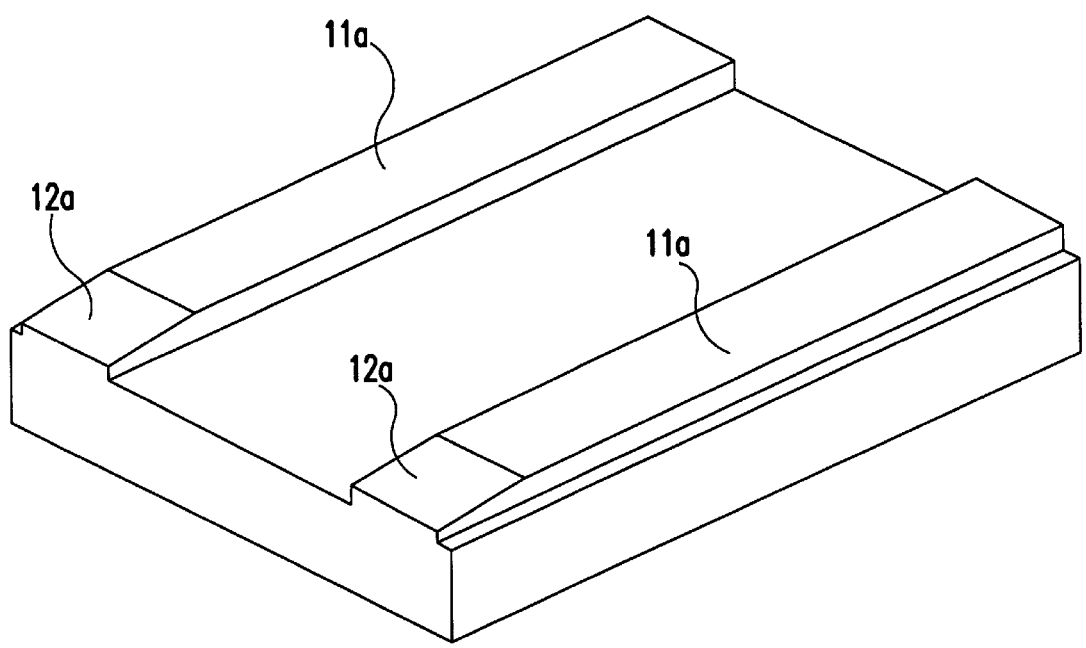
FIG. 1 is a bottom perspective view illustrating a conventional flying tapered flat slider for a hard disc drive.
Figure 2:
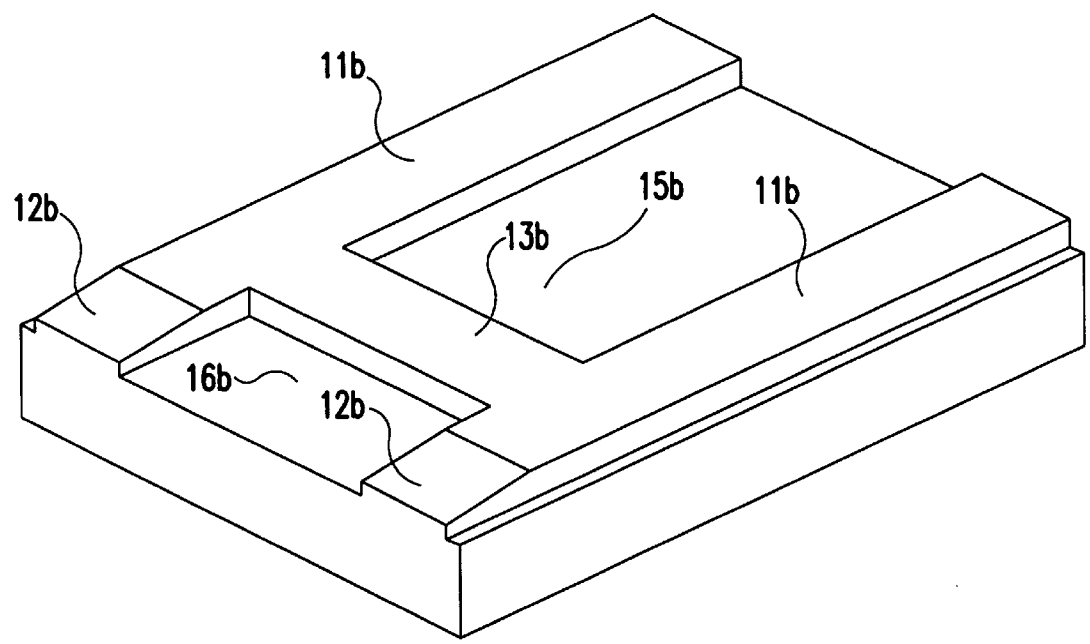
FIG. 2 is a bottom perspective view illustrating a conventional NPAB (negative pressure air bearing) type slider for use in a hard disc drive.
Figure 3:
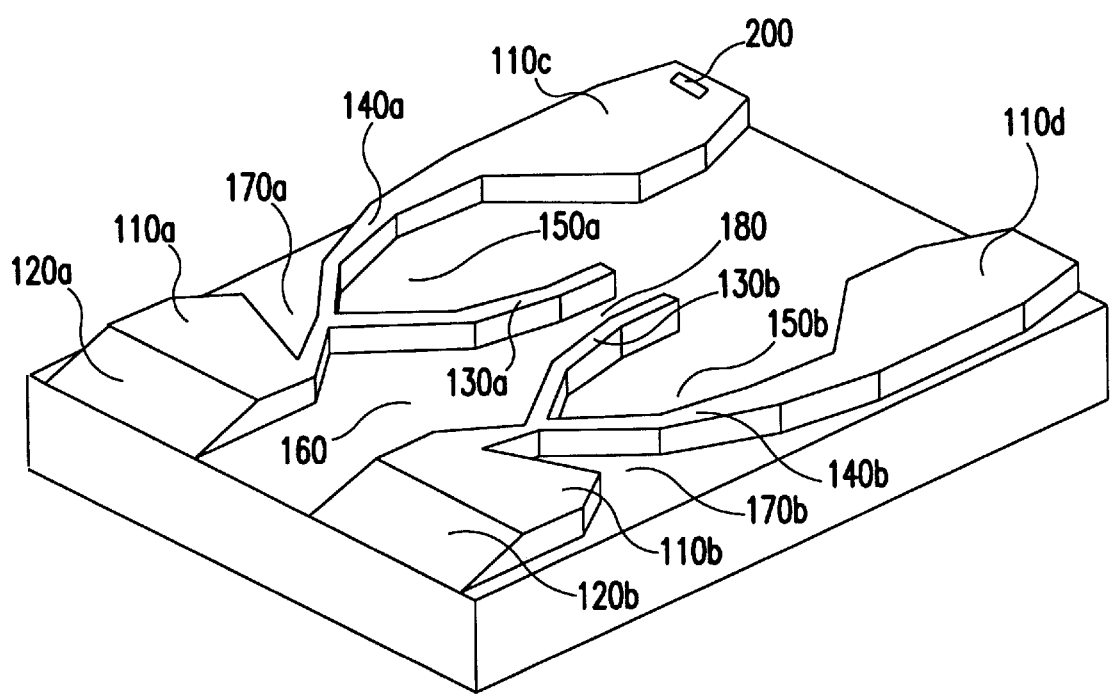
FIG. 3 is a bottom perspective view of a flying NPAB slider embodiment of the present invention.
Figure 4:
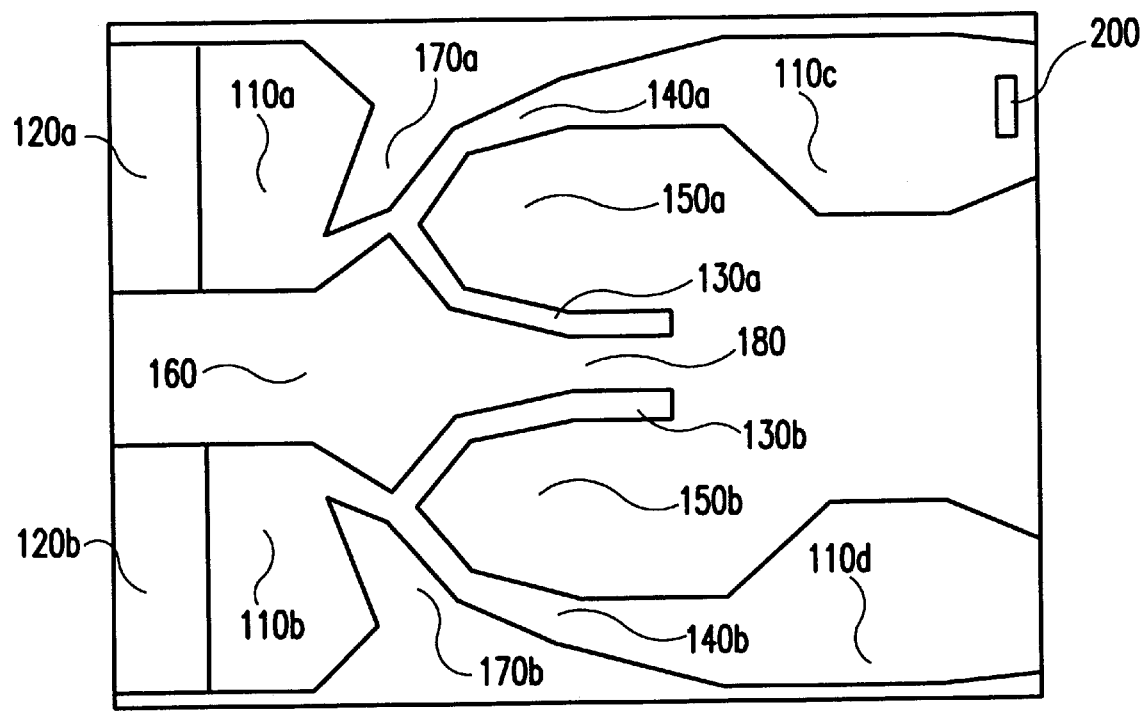
FIG. 4 is a bottom plan view illustrating the flying slider of the embodiment shown in FIG. 3.

The present invention is generally directed to a flying air bearing slider with divided negative pressure pockets or cavities. FIG. 3 is a bottom perspective view of an improved flying NPAB slider of the present invention and FIG. 4 shows a bottom plan view of this improved slider embodiment.

The following discussion is conducted with the understanding that the flying air bearing slider body 100 flies above a surface of a recording disc during relative rotation of the recording disc. The slider body 100 has a principal surface, confronting the disc surface, on which a pattern of rails and recesses are formed. The principal surface has a leading edge (lead portion), a trailing edge (rear portion), a first side and a second side, where the leading edge is spaced upstream of the trailing edge relative to a longitudinal direction of the slider body which is coincident with the tangential rotational direction of the recording disc. The first side is spaced from the second side relative to a lateral direction of the slider body 100.

The slider body 100 has two air bearing rails 105a and 105b, one each along the first and second sides, extending from the leading edge to the trailing edge. The side rails 105a, 105b are symmetrically disposed on opposite sides of a longitudinal axis of the slider body 100 and are aligned with one another in a lateral direction of the slider body 100. The side rails 105a, 105b have tapered sections 120a, 120b at the leading edge for compressing the incoming air in order to generate sufficient positive pressure to support the slider body 100 in a suspended state. The side rails 105a, 105b have wide leading edge surfaces 110a, 110b and trailing edge surfaces 110c, 110d, that provide the main positive lifting force to support the slider body 100 in a suspended state to allow the slider to fly over the disc surface. The transducer 200 is mounted at the rear portion of the outer rail with reference to the disc rotation.

Between the leading edge surfaces 110a, 110b and trailing edge surfaces 110c, 110d, there are provided a series of narrow curved shape cross rails that join to form a plurality of divided negative pressure cavities. Specifically, the interior and exterior curved cross rails 130a, 140a form a first generally U-shaped negative pressure cavity 150a downstream of the rails 130a, 140a, and, the interior and exterior curved cross rails 130b, 140b form a second generally U-shaped negative pressure cavity 150b downstream of the rails 130b, 140b. A third negative pressure cavity 170a is formed upstream of the exterior rail 140a, that is, between the exterior rail 140a and the leading edge surface 110a. Finally, a fourth negative pressure cavity 170b is formed upstream of the exterior rail 140b that is, between the exterior rail 140b and the leading edge surface 110b.

These four divided negative pressure cavities 150a, 170a, 150b, 170b are sub-ambient regions that pull the transducer mounting pad closer to the disc surface with the pulling force being distributed among the four divided sub-ambient pressure regions. With this divided sub-ambient pocket structure, the negative pressure cavities can preserve the distributed pulling forces in a nearly uniform manner, regardless of the skew angle variation.

In other words, the negative pressure cavities function to provide a downward pulling action on the slider body 100, which in turn creates a mass equivalent effect that enhances stability. The rounded configuration reduces the skew angle dependency on the magnitude of mass equivalency. That is, since the negative pressure cavities are rounded, angular variations in the direction of air flow resulting from skew angle changes do not substantially alter the action of the negative pressure cavities. This results in reduced height variations as the slider is positioned at different diameters along the disc surface.

In the present embodiment, there is no laterally disposed, straight cross rail to block the flow of debris. As shown in FIG. 3 and FIG. 4, the interior curved cross rails 130a, 130b are separated by an opening 180. Therefore, debris collection on the slider body 100 during operation may be minimized since the debris can freely flow, basically unimpeded, from the forward section 160 through the opening 180 and beyond the trailing edge. An additional advantage of eliminating a prominent cross rail in the center section is that the slider roll angle is reduced during high skew angle conditions.

In an exemplary implementation of the slider of the present invention, the depth of the air bearing rails was in the range of 2–15 microns ($\mu$m) or micrometers, with the preferred range being between 3.0–6.0 microns ($\mu$m). The length of sliders incorporating the invention is in the range of 1000–4000 microns ($\mu$m), and widths are between 50–100% of slider body length. The flying height of the magnetic head relative to the rotating storage disc is approximately 100–1000 Angstroms (Å).

Figure 5:
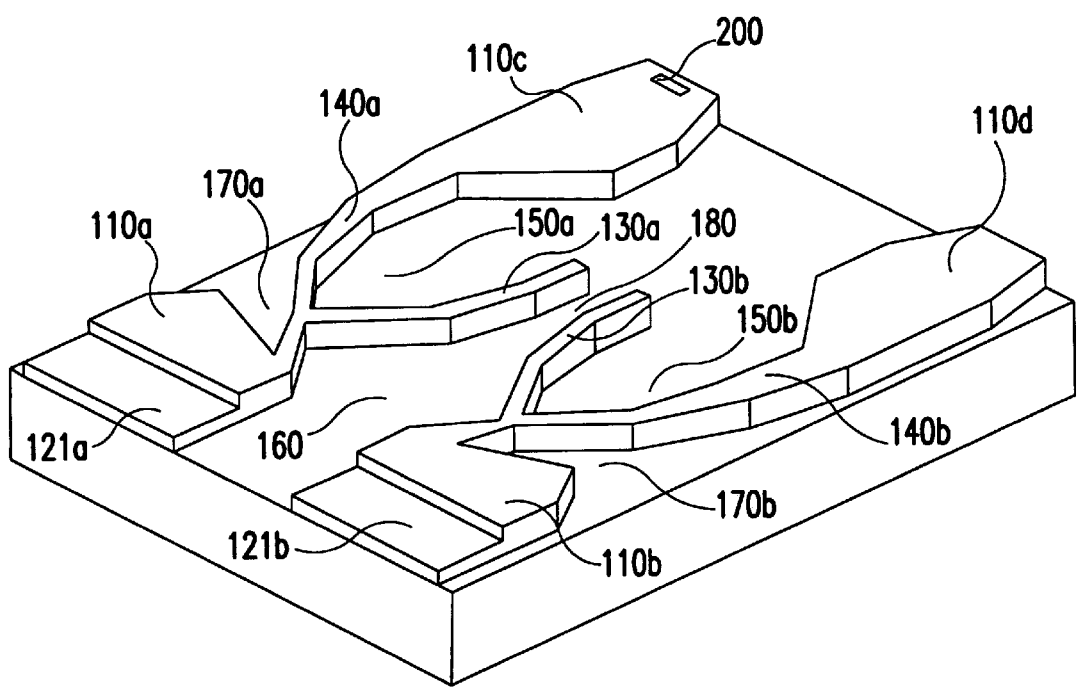
FIG. 5 is a perspective view of another embodiment of a flying NPAB slider according to the present invention incorporating a shallow step at the leading edge of the side rails rather than a taper.

An alternative slider embodiment of the present invention with divided negative pressure cavities is depicted in FIG. 5. The embodiment of FIG. 5 shares many of the same features as the embodiment of FIG. 3, as indicated by the same reference numerals, and will thus not be repeated here. The difference between the two embodiments is the provision for shallow steps 121a, 121b at the respective leading edges of side rails 105a, 105b, rather than the tapered sections 120a, 120b for initially compressing the incoming air to create the slider lifting force.

While the dynamic flying advantages of the FIG. 5 embodiment are almost the same as the FIG. 3 embodiment, the FIG. 5 embodiment requires twice the lithographic mask processing time to create the shallow steps at the leading edge, rather than the tapered leading edge of the FIG. 3 embodiment.

Figure 6:
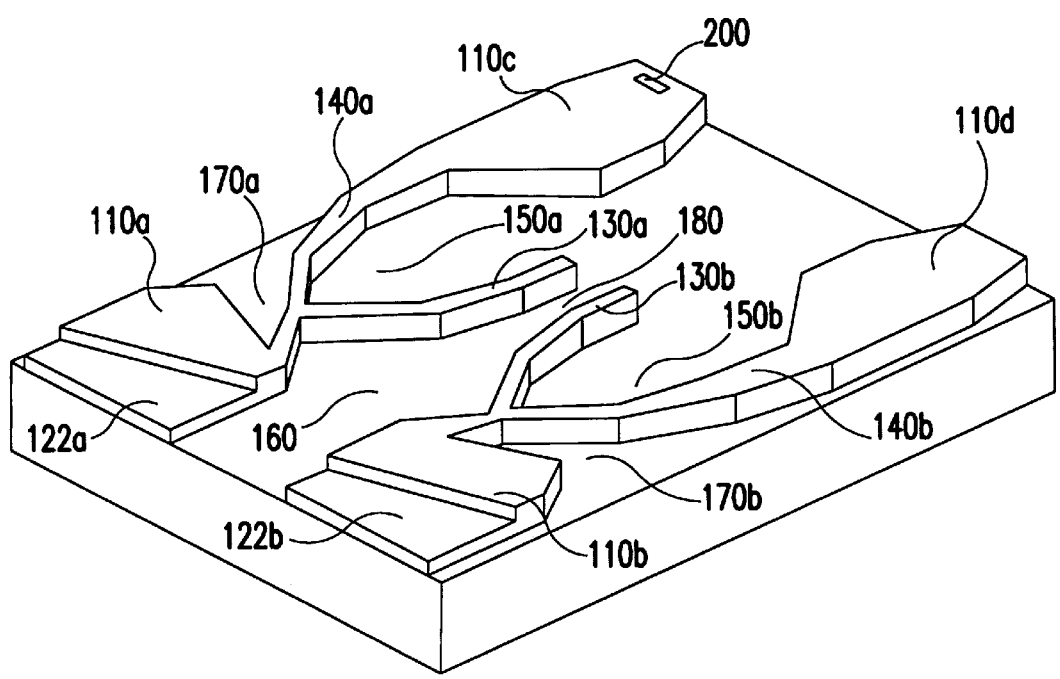
FIG. 6 is a perspective view of another embodiment of a flying NPAB slider according to the present invention incorporating a slanted shallow step at the leading edge of the side rails.

Still another slider embodiment of the present invention with divided negative pressure cavities is depicted in FIG. 6.

Again, the embodiment of FIG. 6 shares many of the same features as the embodiment of FIGS. 3 and 5, as indicated by the same reference numerals, and will thus not be repeated here. The difference between the embodiments is the provision for laterally slanted shallow steps 122a, 122b at the respective leading edges of side rails 105a, 105b, rather than the tapered sections 120a, 120b for initially compressing the incoming air to create the slider lifting force.

The FIG. 6 embodiment has the same functional advantages as the first embodiment in FIG. 3, but also exhibits improved pitch angle variation across the entire disc area, i.e., a more uniform pitch angle. However, similar to the FIG. 5 embodiment, the FIG. 6 embodiment requires twice the lithographic mask processing time to create the slanted shallow steps at the leading edge, rather than the tapered leading edge of the FIG. 3 embodiment.

Figure 7:
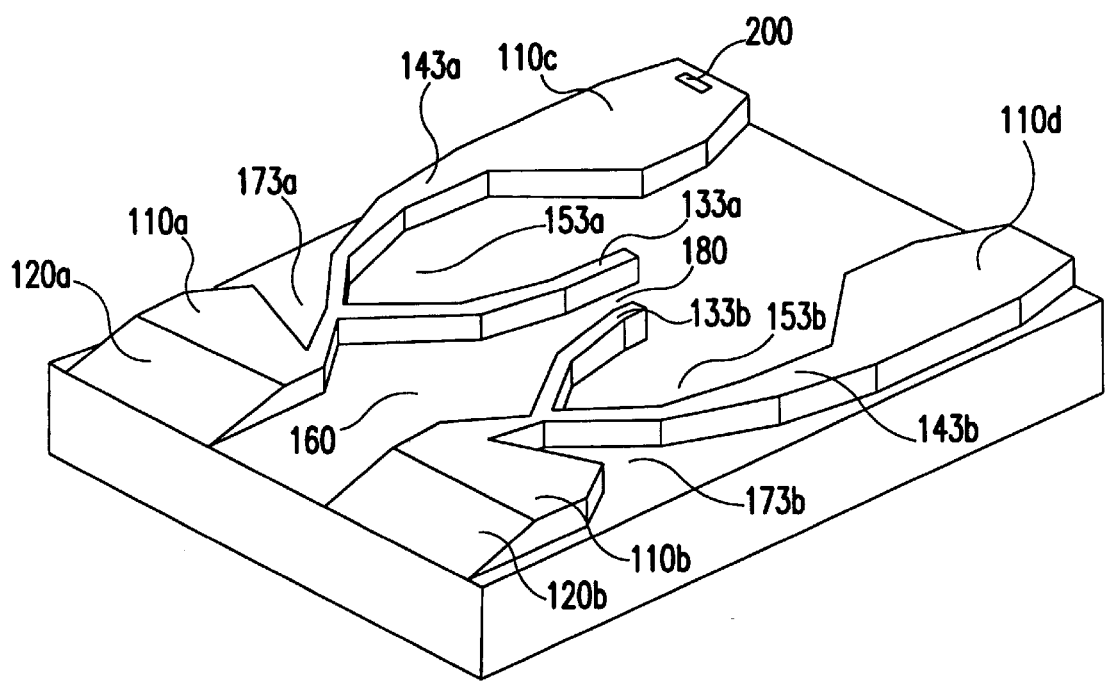
FIG. 7 is a perspective view of another embodiment of a flying NPAB slider according to the present invention incorporating asymmetrical air bearing side rails and negative pressure pockets.

Yet another embodiment of the present invention with divided negative pressure cavities is depicted in FIG. 7. As before, the embodiment of FIG. 7 shares many of the same features of the previous embodiments, as indicated by the same reference numerals, and will thus not be repeated here. One difference between the embodiments is that the curved cross rail 133a, 143a, are not longitudinally symmetrical with the curved cross rails 133b, 143b. Also, interior cross rail 133a extends toward the trailing edge to a greater degree than the interior curved rail 133b, and are therefore not laterally symmetrical. (This asymmetrical configuration is more clearly seen in the plan view of a similar configuration in FIG. 8A.) The asymmetrical cross rails create unequal divided negative pressure cavities 153a and 153b in the central portion of the slider body, as well as unequal divided negative pressure cavities 173a and 173b in the forward portion of the slider body. It is noted that the asymmetrical negative pressure cavities actually stabilize the flying height better than the prior symmetrical embodiments (FIGS. 3–6) across the entire rotating disc surface while the flying head moves from the inner diameter to the outer diameter.

Figure 8A:
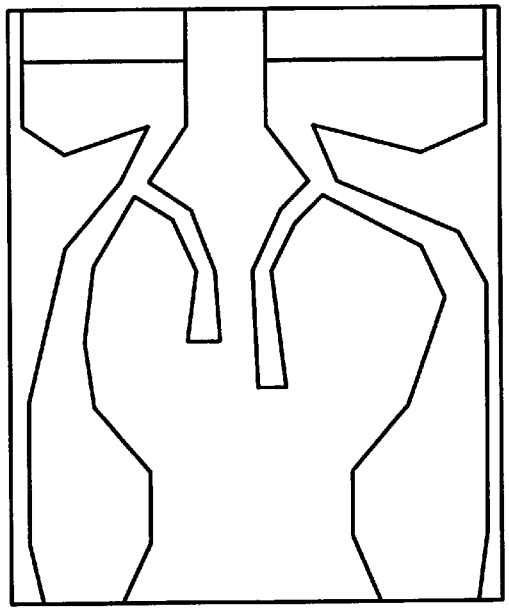
FIG. 8A and FIG. 8B are respective bottom plan views illustrating other shape of sliders with asymmetrical air bearing side rails and four negative pressure air cavities.
Figure 8B:
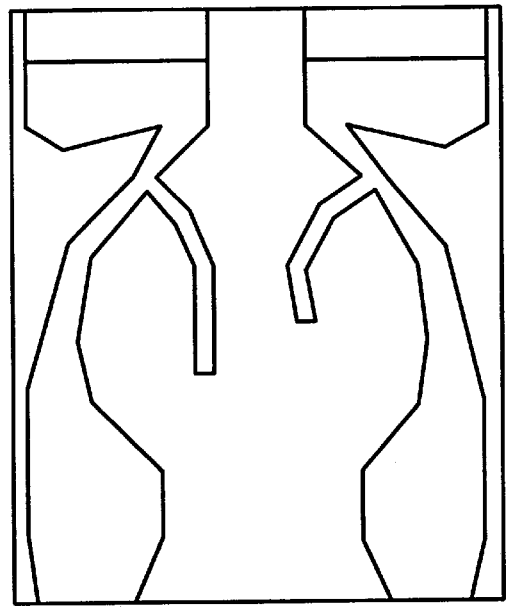

FIG. 8A and FIG. 8B are bottom plan views of other asymmetrical slider configurations. It is noted that any of the features of FIG. 8A and FIG. 8B can be incorporated in any of the prior symmetrical or asymmetrical embodiments to optimize the design for particular operating characteristics.

In FIG. 8A for example, all of the air bearing surfaces and negative pressure cavities are laterally and/or longitudinally asymmetrical, that is, the structures are different on the "a" side (right side as viewed in FIG. 8A) as compared to the "b" side (left side as viewed in FIG. 8A). See, for example, the differences in area or length between the following: tapered edges 124a and 124b; leading edge surfaces 114a and 114b; forward pressure cavities 174a and 174b; interior curved cross rails 134a and 134b; exterior cross rails 144a and 144b; and negative pressure cavities 154a and 154b. Note that the interior cross rail 134a extends toward the trailing edge to a greater degree than the interior curved rail 134b. Also, the opening 184 is offset from the longitudinal axis of the slider body.

In FIG. 8B for example, all of the air bearing surfaces and negative pressure cavities are again laterally and/or longitudinally asymmetrical. See, for example, the differences in area or length between the following: tapered edges 125a and 125b; leading edge surfaces 115a and 115b; forward pressure cavities 175a and 175b; interior curved cross rails 135a and 135b; exterior cross rails 145a and 145b; and negative pressure cavities 155a and 155b. Note that the interior cross rail 135b extends toward the trailing edge to a greater degree than the interior curved rail 135a. Also, the opening 185 is much larger than in prior embodiments.

Figure 9A:
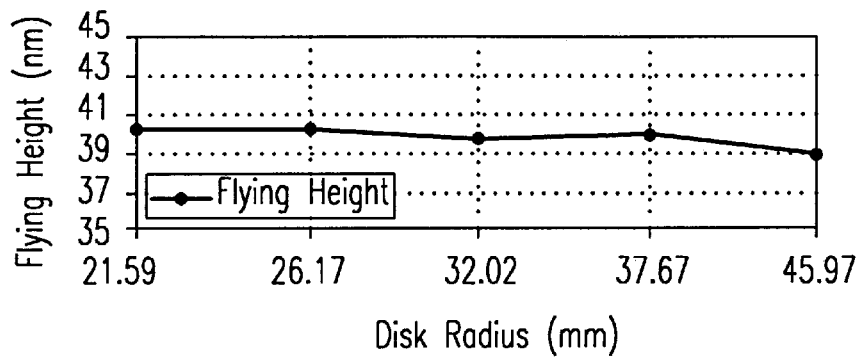
FIG. 9A is a graph illustrating the simulated flying height as a function of the disk radius for the flying NPAB slider according to the present invention.
Figure 9B:
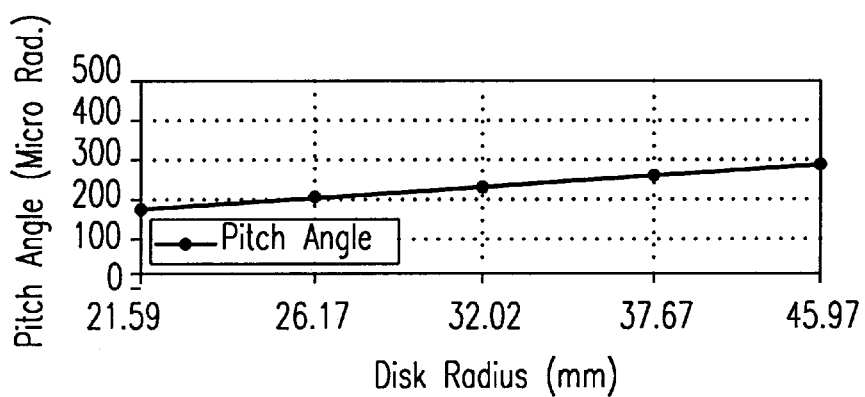
FIG. 9B is a graph illustrating the simulated pitch angle as a function of the disk radius for the flying NPAB slider according to the present invention.
Figure 9C:
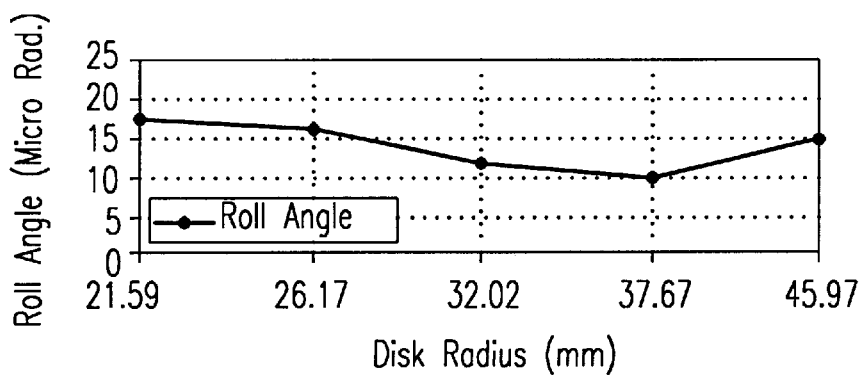
FIG. 9C is a graph illustrating the simulated roll angle as a function of the disk radius for the flying NPAB slider according to the present invention.

FIG. 9A is a graph illustrating the simulated flying height as a function of the disk radius for the flying NPAB slider according to the present invention; FIG. 9B is a graph illustrating the simulated pitch angle as a function of the disk radius for the flying NPAB slider according to the present invention; and FIG. 9C is a graph illustrating the simulated roll angle as a function of the disk radius for the flying NPAB slider according to the present invention. As shown in these graphs, the NPAB type slider of the present invention provides for a nearly uniform flying height across the disc surface from the inner diameter to the outer diameter. Also, the present invention exhibits a pitch angle that falls with a safe and acceptable range and a nearly constant positive roll angle.

As described above, most of the positive pressure is generated at the four corner air bearing surfaces. The four divided negative pressure cavities provide sufficient pulling force at a geometrical central area. This results in stable flying characteristics without substantial variations in the flying height and pitch and roll angles throughout the entire data range.

In general, to achieve the dual goals of electromagnetic functional excellence for data transfer to and from the rotating disc, and flying reliability at the head/media interface, the actual slider design would incorporate asymmetrical air bearing surfaces and unequal negative pressure cavities. The asymmetrical air bearing surfaces and unequal negative pressure cavities compensate for the increased circumferential speed of the air flow and the skew angle variation as the head travels from the inner diameter to the outer diameter of the rotating disc.

While the present invention has been described in terms of the embodiments described above, those skilled in the art will recognize that the invention can be practiced with modification within the spirit and scope of the appended claims and their equivalents.

What is claimed is:

1. A negative pressure air bearing slider, comprising:

a slider body for flying above a surface of a recording disc during relative rotation of the recording disc, the slider body having a principal surface for confronting the disc surface, the principal surface having a lead edge, a rear edge, a first side edge and a second side edge, wherein the lead edge is spaced upstream of the rear edge relative to a longitudinal direction of the slider body which is coincident with a tangential rotational direction of the recording disc, and wherein the first side edge is spaced from the second side edge relative to a lateral direction of the slider body;

first and second projections extending from a lead portion of the principal surface of the slider adjacent to said lead edge, wherein the first and second projections are spaced apart from each other in the lateral direction of the slider body, the first and second projections defining first and second central negative pressure air cavities respectively, and first and second forward negative pressure air cavities respectively for the slider body, the first forward negative air pressure cavity extending between the first projection and the first side edge, and the second forward negative air pressure cavity extending between the second projection and the second side edge; and a transducer mounted on a rear portion of one of the first and second projections so as to be suspended over the disc surface while the disc is rotating.

2. A negative pressure air bearing slider, comprising:

a slider body for flying above a surface of a recording disc during relative rotation of the recording disc, the slider body having a principal surface for confronting the disc surface, the principal surface having a lead portion, a rear portion, a first side portion and a second side portion, wherein the lead portion is spaced upstream of the rear portion relative to a longitudinal direction of the slider body which is coincident with a tangential rotational direction of the recording disc, and wherein the first side portion is spaced from the second side portion relative to a lateral direction of the slider body;

first and second projections extending from the lead portion of the principal surface of the slider, wherein the first and second projections are spaced apart from each other in the lateral direction of the slider body, each of the first and second projections defining a central negative pressure air cavity and a forward negative pressure air cavity for the slider body, each of the first and second projections comprising, a wide leading edge air bearing surface and a wide trailing edge air bearing surface connected by an elongate narrow exterior air bearing surface, and an elongate narrow interior air bearing surface connected to the narrow exterior air bearing surface, wherein the narrow interior air bearing surface and the narrow exterior air bearing surface form a generally U-shaped projection so as to define the central negative air pressure cavity, and wherein the connection between the narrow exterior air bearing surface and the wide leading edge air bearing surface defines the forward negative pressure cavity; and a transducer mounted on a rear portion of one of the first and second projections so as to be suspended over the disc surface while the disc is rotating.

3. A negative pressure air bearing slider as claimed in claim 2, wherein the narrow exterior air bearing surface connects to the wide leading edge air bearing surface proximate to a central longitudinal axis of the slider, and connects to the wide trailing edge air bearing surface proximate to the side portion of the slider body.

4. A negative pressure air bearing slider as claimed in claim 3, wherein distal ends of the narrow interior air bearing surfaces of the first and second projections are configured to define an opening therebetween.

5. A negative pressure air bearing slider as claimed in claim 4, wherein the wide leading edge air bearing surface includes a tapered surface portion extending to the lead portion of the slider body.

6. A negative pressure air bearing slider as claimed in claim 4, wherein the wide leading edge air bearing surface includes a stepped down surface portion extending to the lead portion of the slider body.

7. A negative pressure air bearing slider as claimed in claim 4, wherein the wide leading edge air bearing surface includes a laterally slanted stepped down surface portion extending to the lead portion of the slider body.

8. A negative pressure air bearing slider as claimed in claim 4, wherein the first and second projections are symmetrically configured on opposite sides of the central longitudinal axis of the slider body, such that the respective wide leading edge air bearing surfaces, wide trailing edge air bearing surfaces, narrow exterior air bearing surfaces, narrow interior air bearing surfaces, central negative pressure air cavities and forward negative pressure air cavities, are symmetrically configured on opposite sides of the central longitudinal axis of the slider body.

9. A negative pressure air bearing slider as claimed in claim 8, wherein the opening is centered across the central longitudinal axis of the slider body.

10. A negative pressure air bearing slider as claimed in claim 4, wherein the first and second projections are asymmetrically configured on opposite sides of the central longitudinal axis of the slider body.

11. A negative pressure air bearing slider as claimed in claim 10, wherein the respective wide leading edge air bearing surfaces of the first and second projections have different surface areas and are asymmetrically configured on opposite sides of the central longitudinal axis of the slider body.

12. A negative pressure air bearing slider as claimed in claim 11, wherein the respective wide trailing edge air bearing surfaces of the first and second projections have different surface areas and are asymmetrically configured on opposite sides of the central longitudinal axis of the slider body.

13. A negative pressure air bearing slider as claimed in claim 12, wherein the respective narrow exterior air bearing surfaces of the first and second projections have different surface areas and are asymmetrically configured on opposite sides of the central longitudinal axis of the slider body.

14. A negative pressure air bearing slider as claimed in claim 13, wherein the respective narrow interior air bearing surfaces of the first and second projections have different surface areas and are asymmetrically configured on opposite sides of the central longitudinal axis of the slider body.

15. A negative pressure air bearing slider as claimed in claim 14, wherein the narrow interior air bearing surfaces have different longitudinal lengths.

16. A negative pressure air bearing slider as claimed in claim 14, wherein the respective central negative pressure air cavities of the first and second projections have different areas and are asymmetrically configured on opposite sides of the central longitudinal axis of the slider body.

17. A negative pressure air bearing slider as claimed in claim 16, wherein the respective forward negative pressure air cavities of the first and second projections have different areas and are asymmetrically configured on opposite sides of the central longitudinal axis of the slider body.

18. A negative pressure air bearing slider as claimed in claim 17, wherein the opening is offset from the central longitudinal axis of the slider body.

\* \* \* \* \*